No. 607,583.  
O. BENTZ.  
PHOTOGRAPHIC FINDER.  
(Application filed July 30, 1897.)

Patented July 19, 1898.

(No Model.)

WITNESSES:
M. H. Wurtzel.
J. H. Niles.

INVENTOR
Olivier Bentz
BY
ATTORNEYS.

UNITED STATES PATENT OFFICE.

OLIVIER BENTZ, OF PARIS, FRANCE.

PHOTOGRAPHIC FINDER.

SPECIFICATION forming part of Letters Patent No. 607,583, dated July 19, 1898.

Application filed July 30, 1897. Serial No. 646,459. (No model.)

*To all whom it may concern:*

Be it known that I, OLIVIER BENTZ, a citizen of the Republic of France, residing at Paris, France, have invented certain new and useful Improvements in Photographic Apparatus, of which the following is a specification.

This invention relates to improvements in photographic apparatus, and more particularly to that class of photographic apparatus which is intended for use by tourists and others and which may be easily carried about; and the object of the invention is to provide a finder and film-piercer of simple construction, without projecting parts that might interfere with carrying the apparatus in the pocket, and means for indicating the location of the pictures upon the sensitive film as they are taken through the coöperation of the finder and piercer.

To these ends the invention consists of the combination, in a photographic apparatus, of a finder, a film-piercer, and means for simultaneously operating them, in the special location of the finder with relation to the camera-wall and adjacent parts, and, further, in certain details of construction and combination of parts, as will be more fully described hereinafter and finally pointed out in the claims.

Figure 1:
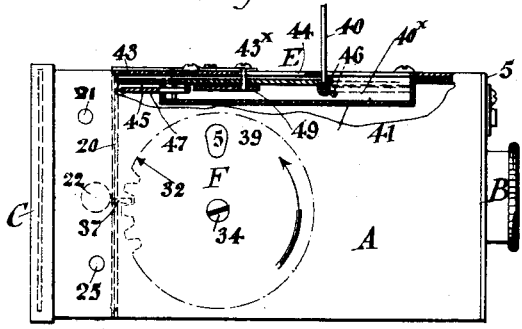
Figure 2:
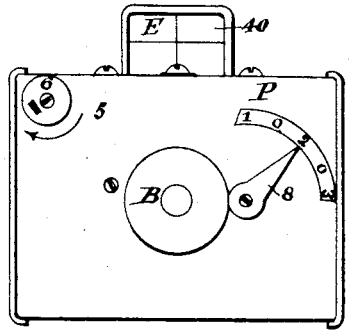
Figure 3:
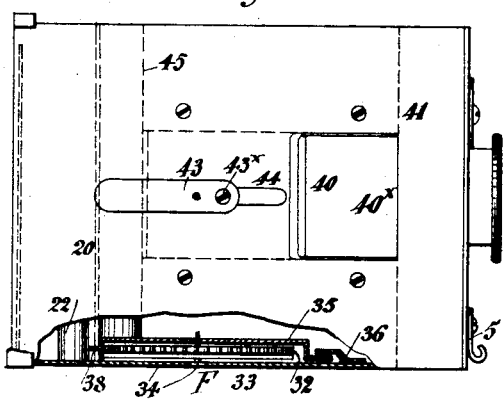
Figure 4:
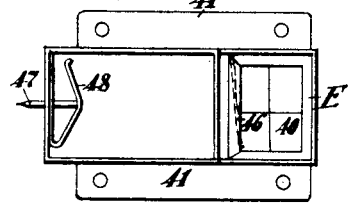
Figure 5:
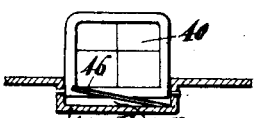

In the accompanying drawings, Figure 1 represents a side elevation, partly in section, of a camera fitted with my improvement. Fig. 2 is a front elevation. Fig. 3 is a plan view, partly in horizontal section, of the same; and Figs. 4 and 5 are detail views of the finder and film-piercer.

Similar letters and figures of reference indicate corresponding parts.

Referring to the drawings, A represents the box or body of a camera, having a lens-tube B, a rear plate C, a counter F, a finder E, and a film-piercer operating in conjunction therewith. The graduated scale P and the parts 5, 6, and 8 relate to the shutter mechanism arranged at the front part of the camera, parts 20 21 22 25 to a film-carrier located in the rear part of the same, and parts 32, 33, 34, 35, 36, 37, 38, and 39 to the counter F in a camera to which my improved finder and piercer mechanism may be applied, the said shutter mechanism, film-carrier, and counter, however, forming no part of the present invention.

The finder E consists of a glass plate 40, divided in sections and supported in a suitable frame pivoted at its lower portion to a point of support located within the camera-body, below and adjacent to an edge of an opening in the top of the same through which the finder passes when lowered from vertical to horizontal position, as shown in dotted lines in Fig. 1. A flanged inclosing plate 41 of suitable size, supporting the finder actuating and retaining spring 46, extends for some distance within the camera and parallel with the upper wall and forms with the same and the plate 45 and a corresponding plate at the front of the camera a pocket or compartment $40^\times$ and prevents light entering through the finder-opening from passing into the dark chamber formed by the inclosing plate and the remaining side and end walls of the camera. A sliding cover-plate 42 is supported within the compartment $40^\times$ by means of a screw $43^\times$, passing through the opening 44 in the top of the camera-box and attached to an exterior finger-piece 43. The screw passes through the cover-plate and supports below the same a push-piece 49 for actuating the film-piercer. The film-piercer consists of a pin 47, located in the rear wall of the inclosing plate 41, is attached at its inner end to the spring 48, and has its outer end pointed to pierce the film to which it is adjacent.

The finder shown in Fig. 1 is retained in raised operative position by the spring 46. The camera may now be held in the usual manner and the object to be taken brought within the range of the finder and photographed by operating the shutter mechanism. For lowering the finder the finger-piece 43 is pushed forward, together with the cover-plate 42, so that the finder is forced down to horizontal position and the cover-plate slid over the finder, so as to close the finder-opening, as shown in Fig. 1 in dotted lines, and place the spring 46 under tension. The compartment $40^\times$ is now tightly closed and dust and dirt excluded, and the camera may be carried without danger of the finder being damaged or catching in the pocket. When a new section of the film has been placed in position by the operation of the film-carrier, the finder is released for taking a photograph by drawing the finger-piece 43 back so that the spring 46 raises the finder to upright position. The finger-piece 43 is moved back until its progress is arrested by the abutment of the sliding cover-plate 42 against the plate 45. In this operation the push-piece 49 is brought in contact with the spring 48, causing the pin 47 to pierce the film, which is represented by dotted lines in the rear portion of the camera in Fig. 1. The spring 46 is of sufficient strength to retain the finder in upright position against the tension of the spring 48, which tends to lower the same, and the pin 47 is thus retained in the film so long as the finder is raised. The exposure is then made by any suitable shutter mechanism. In order to take a second picture, it is necessary to partly lower the finder and place a new section of the film in position without tearing the same. The finder being again raised, the pin pierces the new film-section, indicating the new picture. This operation may be repeated until the film is exhausted or the desired views have been obtained, and the finder is then closed within the compartment in the manner before described. The location of each picture is thus indicated on the film and errors and loss in developing avoided.

Having thus described my invention, what I claim is—

1. In a photographic apparatus, the combination of a pivoted finder and a spring for retaining said finder in raised operative position, substantially as set forth.

2. In a photographic apparatus, the combination with the casing provided with a slot, of a finder, a film-piercer, a pin guided in the slot of the casing, a finger-piece attached to said pin at its outer end, and means actuated by said pin at its inner end for simultaneously operating said finder and film-piercer, substantially as set forth.

3. In a photographic apparatus, the combination, with the casing provided with an opening in its top, of a depressed plate forming a compartment below said top opening, a spring-actuated finder, and means for lowering the finder into said compartment, substantially as set forth.

4. In a photographic apparatus, the combination, with the casing having a top opening, and a depressed top plate forming a compartment below said opening, of a finder adapted to move into said compartment, a film-piercer in said compartment, and means for simultaneously raising the finder and actuating the film-piercer, substantially as set forth.

5. In a photographic apparatus, the combination with the casing having a top opening, and a depressed top plate forming a compartment below said opening, of a finder adapted to move into said compartment, and a plate sliding in said compartment for closing said opening and inclosing said finder within the compartment, substantially as set forth.

In witness whereof I have hereunto set my hand in presence of two witnesses.

OLIVIER BENTZ.

Witnesses:
MAX PLEYTER,
GEORGE CLAVIER.